United States Patent [19]
Terui

[11] Patent Number: 5,890,018
[45] Date of Patent: Mar. 30, 1999

[54] CAMERA SHAKE AMPLITUDE DETECTING DEVICE

[75] Inventor: Nobuhiko Terui, Ichikawa, Japan

[73] Assignee: Nikon Corporation, Tokyo, Japan

[21] Appl. No.: 928,345

[22] Filed: Sep. 12, 1997

Related U.S. Application Data

[62] Division of Ser. No. 810,286, Mar. 3, 1997, Pat. No. 5,701,522, which is a continuation of Ser. No. 687,232, Jul. 25, 1996, abandoned, which is a continuation of Ser. No. 478,362, Jun. 7, 1995, abandoned, which is a continuation of Ser. No. 376,432, Jan. 23, 1995, abandoned, which is a continuation of Ser. No. 137,963, Oct. 19, 1993, abandoned, which is a continuation-in-part of Ser. No. 131,939, Oct. 5, 1993, abandoned, which is a continuation of Ser. No. 32,250, Mar. 17, 1993, abandoned, which is a division of Ser. No. 835,576, Feb. 14, 1992, abandoned.

[30] Foreign Application Priority Data

Mar. 6, 1991 [JP] Japan ................................. 3-039869
Jul. 2, 1993 [JP] Japan ................................. 5-190876

[51] Int. Cl.$^6$ .................................................. G03B 17/00
[52] U.S. Cl. .................................................. 396/53
[58] Field of Search ........................ 396/52, 53, 55; 348/208; 359/554

[56] References Cited

U.S. PATENT DOCUMENTS 5,616,177 4/1997 Imafuji et al. .......................... 396/53
5,717,611 2/1998 Terui et al. .......................... 348/208 X Primary Examiner—W. B. Perkey
Attorney, Agent, or Firm—Shapiro and Shapiro

[57] ABSTRACT

A camera shake amplitude detecting device comprises a mechanical detector for detecting a shake acceleration when a camera body is shaken, and a mechanical shake calculation device for calculating a shake amplitude of the camera body based on the detection output of the mechanical detector. The mechanical shake calculation device discriminates a time point of change between a positive acceleration and a negative acceleration based on the detection output of the mechanical detector, calculates and integration constant, and calculates a velocity by integrating by time the acceleration detected by the mechanical detector.

In order to reduce the time required to calculate exact angular velocity, the constitution comprises an angular velocity sensor for detecting a shake of a camera, a high-pass filter for filtering off certain low frequency components of the output from the angular velocity sensor, a switch means for initializing the high-pass filter when the power source is turned on and a control means for detecting the time when the output of the angular velocity sensor becomes equal to 0 and switching the switch means to bring the high-pass filter in the active state.

6 Claims, 11 Drawing Sheets

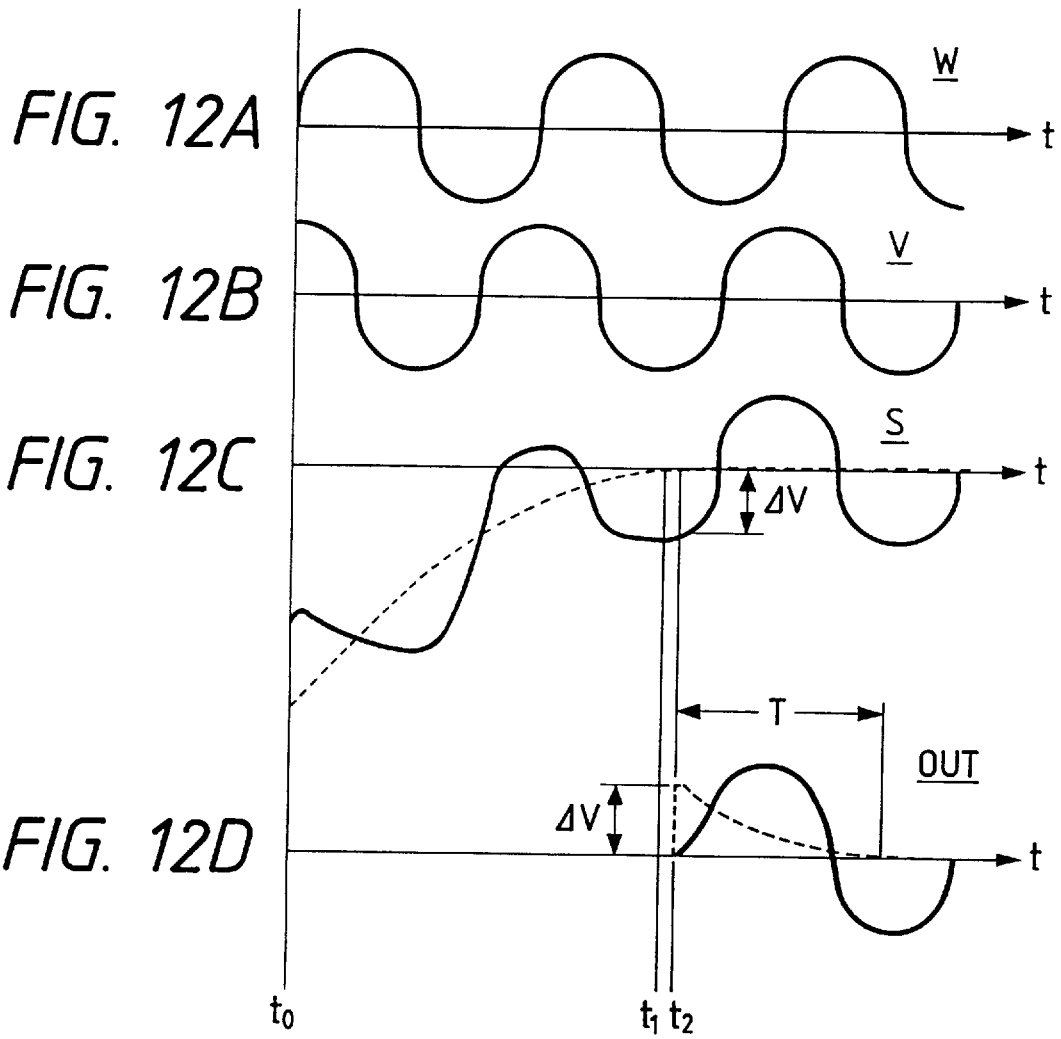

CAMERA SHAKE AMPLITUDE DETECTING DEVICE

RELATED APPLICATION

This is a division of application Ser. No. 08/810,286 filed Mar. 3, 1997, now U.S. Pat. No. 5,701,522 which is continuation of application Ser. No. 08/687,232 filed Jul. 25, 1996, now abandoned, which is a continuation of application Ser. No. 08/478,362 filed Jun. 7, 1995, now abandoned, which is a continuation of application Ser. No. 08/376,432 filed Jan. 23, 1995, now abandoned, which is a continuation of application Ser. No. 08/137,963 filed Oct. 19, 1993, now abandoned, which is a continuation-in-part of application Ser. No. 08/131,939 filed Oct. 5, 1993, now abandoned, which is a continuation of application Ser. No. 08/032,250 filed Mar. 17, 1993, now abandoned, which is a division of application Ser. No. 07/835,576 filed Feb. 14, 1992, now abandoned.

BACKGROUND OF THE INVENTION

1. Field of the Invention

The present invention relates to a device which detects a shake of a camera to prevent the shake.

2. Related Background Art

An optical detection method and a mechanical detection method have been known to detect camera shake.

In the optical detection method, a two-dimension image sensor or a plurality of one-dimension image sensors are used to detect a positional displacement of an object image by the shake.

The mechanical detection method includes an acceleration detection method in which an acceleration of the shake when a camera body is shaked is detected to calculate the positional displacement of the object image based on the acceleration, and an angular velocity detection method in which an angular velocity of the shake when the camera body is shaked is detected to calculate the positional displacement of the object image based on the angular velocity.

When the optical shake detection method is applied to the camera, it is necessary in a one-eye reflex type camera to drive a mirror up immediately before a photograph is taken so that all lights through an objective lens are directed to a film when the photograph is taken. As a result, in the optical shake detection method, the shake can be detected until immediately before the photographing but cannot be detected during the photographing.

When the mechanical shake detection method is applied to the camera, in the acceleration detection method, the shake cannot be detected during a constant velocity motion even if the shake is large, because it detects only the acceleration. Further, if a period of shake is long (a frequency of shake is low), the acceleration is low even if the shake is large, and the detected acceleration is small and detection error is large.

In the angular velocity detection method, a high precision gyroscope (for example, a laser gyroscope) used as a detector is large in size and expensive, and an inexpensive one is of low precision and difficult to determine if the velocity is zero or not. Further, when the period of shake is long (the frequency of shake is low), the angular velocity is low even if the shake is large, and the detected velocity is low and the detection error is large.

And in the conventional apparatus for detecting an unintentional movement of hands as shown in FIG. 11, an angular velocity sensor 201 detects angular velocity of a camera, a low-pass filter (hereinafter referred as "LPF") 202 filters off the high frequency components other than the unintentional movement of hands, and further a high-pass filter (hereinafter referred as "HPF") 203 consisting of a condenser C and a resistance R filters off the low frequency components other than the unintentional movement of hands including the direct current components. The output of the HPF 203 is amplified by a non-inverting type operational amplifier 204 and applied to an A/D conversion input terminal 205a of a control circuit 205 including a computer.

A connection point between the condenser C and the resistance R, which constitute the HPF 203, is connected with one terminal of a switch 206, while the other terminal of the switch 206 is earthed. The switch 206 is controlled, that is, turned on/off, according to a control signal output from a control terminal 205b of the control circuit 205.

In this constitution, when the power source (not shown) is turned on, the switch 206 is turned on to earth the connection point between the condenser C and the resistance R, thereby initializing the HPF 203. As the output of the non-inverting type operational amplifier 204 is arranged to be equal to 0 when the input value is 0, the output becomes equal to 0 V when the switch 206 is turned off.

The output of the angular velocity sensor 201 becomes static only some time after the power source is turned on, when the angular velocity can be detected. Therefore, after a predetermined time elapses, a control signal is output from the control terminal 205b of the control circuit 205 in order to turn off the switch 206 and bring the HPF 203 into the active state. Thus, a signal of the angular velocity of the unintentional movement of hands is output from the operational amplifier 204. Said signal is converted in the control circuit 205 into a digital signal in order to calculate the amount of the movement of hands.

FIGS. 12A to 12D are views showing waveforms obtained in respective units after the time (t=t0) when the power source is turned on, wherein the camera is shaken with the movement of hands. FIG. 12A shows the angular displacement, which is obtained by the angular velocity sensor 201, caused by the movement of hands. FIG. 12B shows the angular velocity v of the movement of hands, which is obtained as the output of the angular velocity sensor 201. FIG. 12C shows the output S of the LPF 202 and FIG. 12D shows the output OUT of the operational amplifier. Note that, in FIG. 12C, the broken line indicates the state without the movement of hands.

By the way, if the angular displacement ω caused by the movement of hands is represented as a sine wave as shown in FIG. 12A, the phase of the angular velocity v should be shifted theoretically from that of the angular displacement ω by 90°, as shown in FIG. 12B. In fact, however, only after the time (t=t1) for the angular velocity sensor to obtain stationary state elapses, the output of the angular velocity sensor 201 begins to correspond to the actual angular velocity, as shown in FIG. 12C.

When the switch 206 is turned off at time t2, when the time required for the angular velocity sensor 201 to obtain stationary state has already elapsed, the output OUT of the operational amplifier 204 at the time t2 is equal to 0 V. On the other hand, the output S of the LPF 202 is equal to 0 when there is no movement of hands, but becomes equal to the angular velocity Δ v of the movement of hands when the movement thereof exists. Accordingly, when the movement of hands exists, the angular velocity v at the moment the switch 206 is turned off can not be obtained according to the output OUT of the operational amplifier 204.

More specifically, the angular velocity v when the movement of hands exists, which is indicated by the broken line in FIG. 12D, can be expressed as follows:

$$\Delta v [1-EXP\{-(t-t2)/CR\}]$$

If the angular velocity at the time when the output OUT of the operational amplifier 204 is equal to 0 V, the value of the error is obtained according to the above expression. Therefore, the greater the angular velocity Δ v of the movement of hands when the switch 206 is turned off becomes, the longer the time T until the operational amplifier 204 outputs the exact angular velocity v becomes, which is troublesome.

SUMMARY OF THE INVENTION

It is an object of the present invention to provide a camera anti-shaking device for compensating the shake before and during the photographing by using both an optical shake detection device and a mechanical shake detection device.

Accordingly, another object of the present invention is to reduce the time required to calculate the exact angular velocity.

In order to achieve the above object, the present invention is provided with shake calculation output switching means which selects an output produced by optical shake calculation means when a photograph is not taken or an output level of an optical sensor is higher than a predetermined level, and selects an output produced by mechanical calculation means during the photographing or the output level of the optical sensor is lower than the predetermined level.

The present invention is further provided with calculation output modification means which calculates a shake velocity based on the output produced by the optical shake calculation means and modifies the output produced by the mechanical shake calculation means based on the detection by the mechanical sensor when the calculated shake velocity is lower than a predetermined level.

In order to achieve second object, the constitution according to the present invention comprises:

an angular velocity sensor for detecting the shake of a camera;

a high-pass filter for filtering off certain low frequency components of the output from the angular velocity sensor;

a switch means for initializing the high-pass filter when the power source is turned on; and a control means for detecting the time when the output of the angular velocity sensor becomes equal to 0 and switching the switch means to bring the high-pass filter in the active state.

Other constitution according to the present invention comprises:

an angular velocity sensor for detecting the shake of the camera;

an operation means for calculating an angular acceleration from the output from the angular velocity sensor;

a storage means for storing an error of the output of the angular velocity sensor according to the operation means; and a correction means for correcting the output of the angular velocity sensor according to the output of the storage means.

In accordance with the present invention, the shake can be calculated under any circumstance to compensate the shake by the provision of the calculation output switching means which selects the output produced by the optical shake calculation means when the photograph is not, taken or when the output level of the optical sensor is higher than the predetermined level, and selects the output produced by the mechanical shake calculation means which detects the acceleration or the angular velocity and calculates the shake based thereon during the photographing or when the output level of the optical sensor is lower than the predetermined level.

In accordance with the present invention, the detection precision of the mechanical shake calculation means which is lower than that of the optical shake calculation means can be compensated by the provision of the calculation output modification means which modifies the output of the mechanical shake calculation means based on the output shake calculation means when the shake velocity detected by the optical shake calculation means is lower than the predetermined level.

In still other constitution according to the present invention, a control means monitors the output of an angular velocity before being filtered through a high-pass filter so that a switch means is turned off at the time when angular velocity is minimized, most preferably, to be equal to 0. Thus, an exact angular velocity can be obtained right after the switch means is turned off.

As correction is carried out on the basis of a stored error of the output of the angular velocity sensor, an exact angular velocity can be obtained right after the switch means is turned off even if the switch means is not turned off on time, that is, at a time when the angular velocity is not equal to 0.

BRIEF DESCRIPTION OF THE DRAWINGS

FIGS. 12A to 12D are views showing waveforms obtained in respective units shown in FIG. 11.

DETAILED DESCRIPTION OF THE PREFERRED EMBODIMENTS

Figure 1:
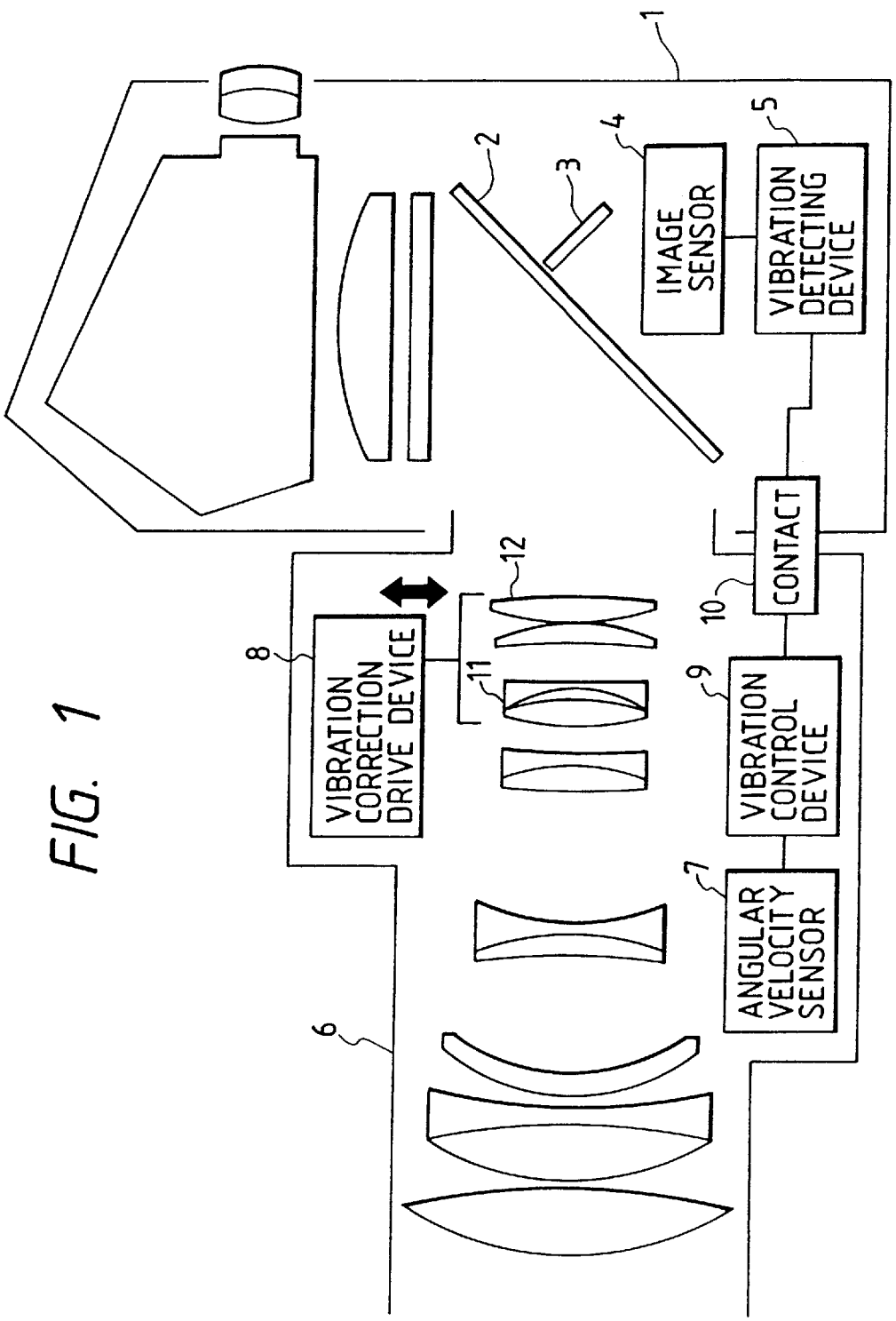
FIG. 1 shows a configuration and a block diagram of one embodiment of the present invention.

FIG. 1 shows a configuration and a block diagram of a first embodiment of a camera in accordance with the present invention.

A main mirror 2 and sub-mirror 3 are mounted in a camera body 1. The main mirror 2 is a half-mirror, and a light beam from a lens barrel 6 is directed by the sub-mirror 3 to an image sensor 4 which detects shake. The image sensor 4 is positioned at a distance which is equal to a distance from the sub-mirror 3 to a film surface, and detects an object image. An output of the image sensor 4 is sent to a shake detector 5 which calculates a positional displacement (shake X) of the object image based on the output sent from the image sensor 4 and supplies the calculated shake to a shake control unit 9 arranged in a lens barrel 6 through a contact 10. When the shake detector 5 receives a mirror drive-up signal from a release control circuit (not shown) or when an output level from the image sensor 4 is lower than a predetermined level, it sends a detection disable signal to the shake control unit 9.

One angular sensor 7 for detecting the shake is arranged in the lens barrel 6 along a vertical axis of the lens barrel 6 and another angular sensor 7 is arranged along a horizontal axis. Outputs of the angular sensors 7 are sent to the shake control unit 9. A pair of shake compensation drivers 8 are arranged along the vertical axis of the lens barrel 6 and another pair of shake compensation drivers 8 are arranged along the horizontal axis. The shake compensation drivers 8 drive shake compensation lenses 11 and 12 in accordance with the outputs from the shake control unit 9. When the shake control unit 9 does not receive the detection disable signal from the shake detector 5, it supplies drive signals to the shake compensation drivers 8 in accordance with the positional displacement (shake amplitude X) of the object image supplied from the shake detector 5 through the contact 10, and when it receives the detection disable signal from the shake detector 5, it calculates the shake X based on the output of the angular velocity sensor 7 by a formula (3) to be described later, and supplies the drive signals to the shake compensation drivers 8 in accordance with the calculated shake amplitude.

Figure 2:
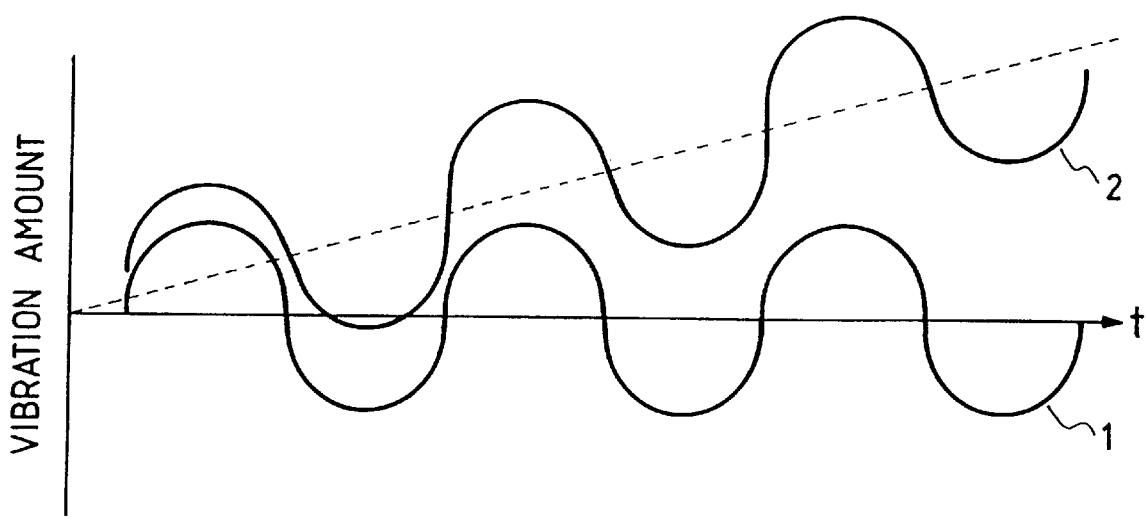
FIG. 2 shows waveforms of a motion of an object as determined by a camera body and a motion of the camera body as determined by an angular velocity sensor 7 in the anti-shaking device of the embodiment, in which a waveform 1 shows an output waveform of a shake amplitude X produced by a shake detector 5, and a waveform 2 shows an output waveform of the shake amplitude X produced by an angular velocity sensor 7.

FIG. 2 shows waveforms of a motion of the object image as determined by a camera body and a motion of the camera body as determined by the angular sensor 7. A waveform 1 shows an output waveform of the shake amplitude X from the shake detector 5, and a waveform 2 shows an output waveform of the shake amplitude X calculated based on the output of the angular velocity sensor 7.

The shake amplitude X of the image on the film surface is generally given by:

$$X = f \cdot \theta$$

where θ is an angular change of the image to the optical axis due to the shake, and f is a focal length of the lens.

Accordingly, the angular velocity ω and the shake amplitude X have the following relation:

$$xf = f \cdot \omega dt \qquad (1)$$

when the output of the angular velocity sensor 7 includes an offset δ to be described later, the shake amplitude X is given by:

$$Xf = f \cdot (\omega + \delta) dt$$

$$f = f \cdot \omega dt + f \cdot \delta \cdot t \qquad (2)$$

Thus, an error increases in proportion to the time.

If the shake velocity is zero, the detection by the angular velocity sensor 7 is to be zero, but a definite value other than zero may sometimes be detected. Such a detection is called the offset of the angular velocity sensor 7.

When the angular velocity sensor 7 includes positive offset, the offset δ is integrated in the calculation of the shake amplitude X. As a result, an error (f·δ·t) which is proportional to the time is added to the shake amplitude X and the waveform 2 rises as it goes toward a right end. (If the offset is negative, the error of the shake amplitude X is −(f·δ·t) and the waveform 2 falls as it goes toward the right end.

Figure 3:
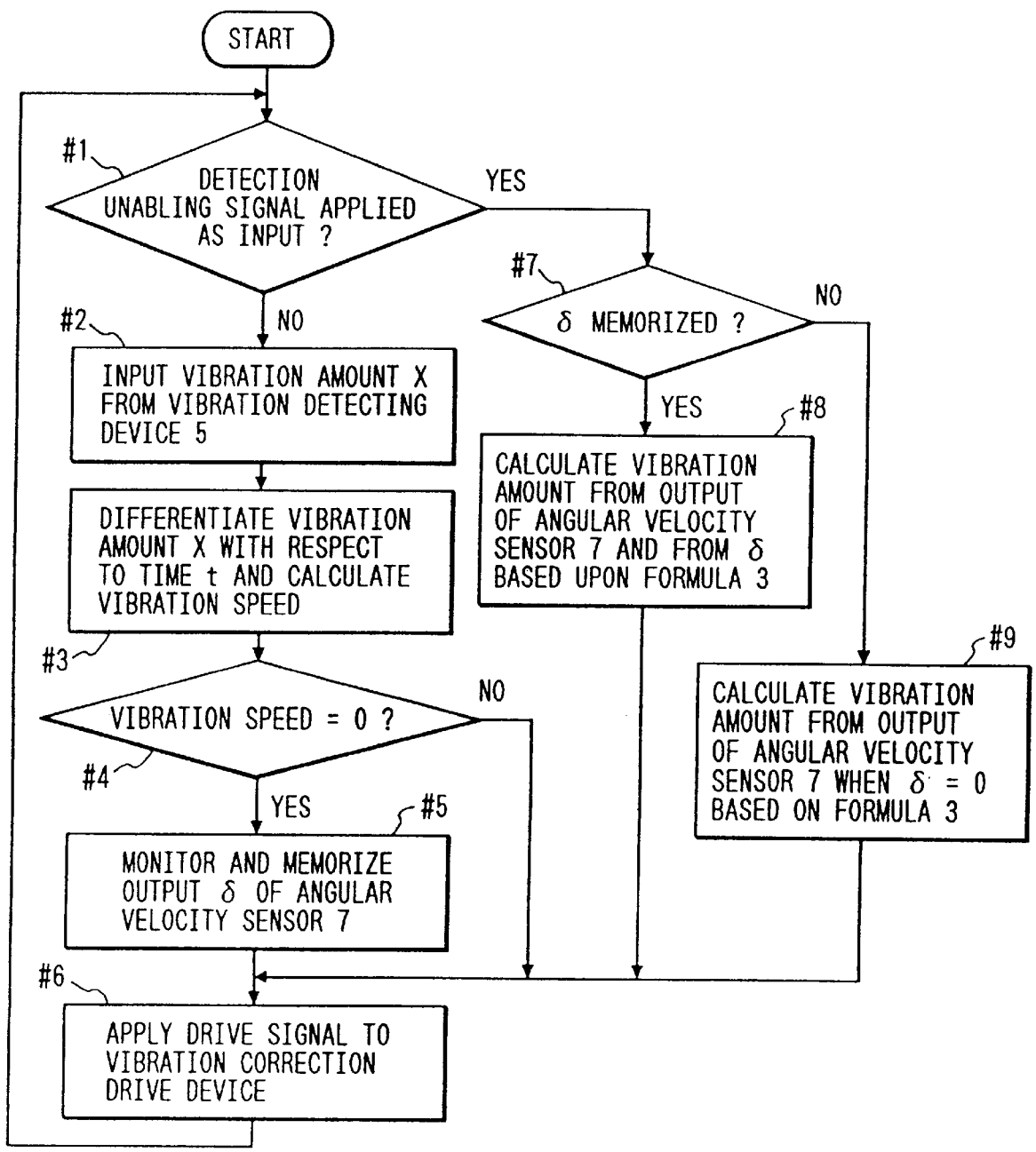
FIG. 3 shows a flow chart of an operation of a CPU in a shake control unit 9 of the embodiment.

FIG. 3 shows a flow chart of an operation of a CPU in the shake control unit 9. In the present embodiment, when the detection of the shake by the optical shake detection device is not permitted during the photographing or when an environmental brightness is low, the output of the mechanical shake detection device which calculates the shake amplitude X by detecting the angular velocity is used. Further, in the present embodiment, the angular velocity sensor of the mechanical shake detection device detects the angular velocity even when the shake is compensated by using the optical shake detection device. The flow chart of FIG. 3 is explained below.

When a power switch (not shown) is turned on, the flow is started.

In a step 1, whether the output level from the image sensor is lower than the predetermined level because of a low environmental brightness, the detection disable signal indicating the detection of the shake amplitude X is disabled is produced by the shake detector 5 and it is supplied to the shake control unit 9 or not is determined. If it has been supplied, the process proceeds to a step 7, and if it has not been supplied, the process proceeds to a step 2. The detection disable signal is produced not only when the environmental brightness is low but also when a release button (not shown) is fully depressed to turn on a release switch (not shown).

In the step 2, the shake amplitude signal X produced by the shake detector 5 is received through the contact 10.

In a step 3, the shake amplitude X supplied in the step 2 is differentiated by time to calculate a shake velocity.

In a step 4, whether the shake velocity calculated in the step 3 is zero or not is determined. If the shake velocity when the shake amplitude is inputted is zero (that is, the shake amplitude is zero), the offset δ of the angular velocity sensor 7 is checked in a step 5, and if the shake velocity is not zero, the process proceeds to a step 6.

In the step 5, the output of the angular velocity sensor 7 is monitored and the output 8 is stored. The stored value δ is used as the offset of the angular velocity sensor 7. Each time the zero speed is detected in the step 4, the stored offset is updated. Thus, the shake amplitude X can always be calculated by a formula (3) to be described later with the latest offset δ.

In a step 7, whether the offset δ has been calculated and stored in the step 5 or not is determined. If it has been stored, the process proceeds to a step 8, and if it has not been stored, the process proceeds to a step 9.

In the step 8, an angular velocity which is the output of the angular velocity sensor 7 less the offset δ stored in the step 5 is integrated by time t as shown by the formula (3) to calculate the shake amount X. Then, the process proceeds to the step 6. In the step 9, the output (angular velocity) of the angular velocity sensor 7 is integrated by time t as shown in the formula (3) with δ=0 to calculate the shake amplitude X. Then, the process proceeds to the step 6.

$$X = \int f \cdot (\delta_s + \delta) dt \tag{3}$$

where $\delta_s$ is the angular velocity detected by the angular velocity sensor 7.

The angular velocity $\delta_s$ detected by the angular velocity sensor 7, the actual angular velocity ω and the offset δ have the following relationship:

$$\omega_s = \omega + \delta$$

In the step 6, if the detection disable signal has not been received in the step 1, a drive signal is supplied to the shake compensation driver 8 in accordance with the shake amplitude X received in the step 2, and the process returns to the step 1. If the detection disable signal has been received in the step 1, a drive signal is supplied to the shake compensation driver 8 in accordance with the shake amplitude X calculated in the step 8 or 9, and the process returns to the step 1.

The process of receiving or calculating the shake amplitude X and supplying the drive signal to the shake compensation driver 8 in accordance with the shake amplitude X is repeated until the power switch (not shown) is turned off.

Figure 4:
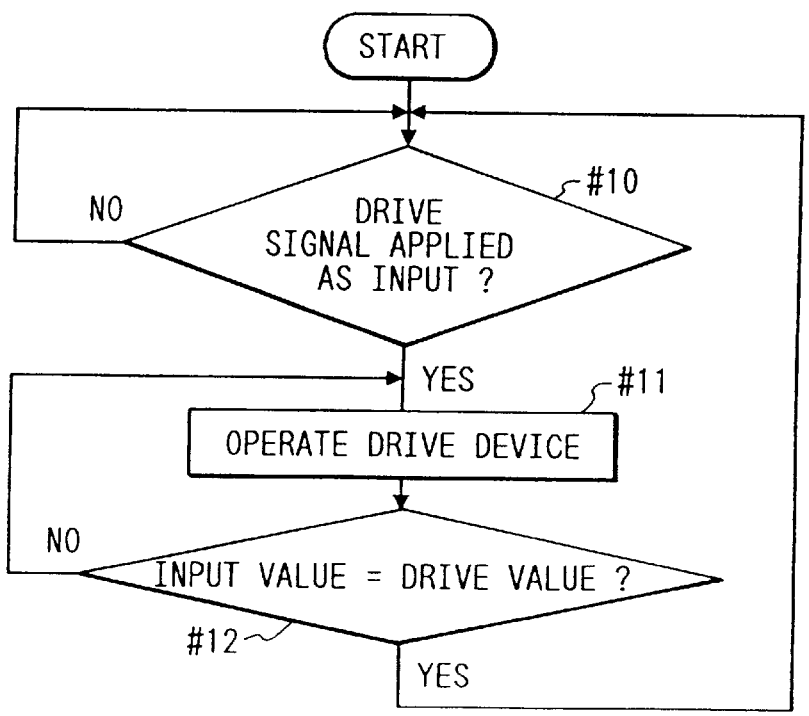
FIG. 4 shows a flow chart of an operation of a CPU in a shake compensation unit 8 of the embodiment and a modification thereof.

FIG. 4 shows a flow chart of an operation of a CPU in the shake compensation driver 8.

Like the flow chart of the shake control unit 9 shown in FIG. 3, the flow is started when the power switch (not shown) is turned on.

In a step 10, whether the drive signal from the shake control unit 9 has been received or not is determined. If it has been received, the process proceeds to a step 11, and if it has not been received, the process waits for the input of the drive signal.

In the step 11, the shake compensation lenses 11 and 12 are driven in accordance with the input drive signal.

In a step 12, whether the input and the drive signal used to drive the shake compensation lenses 11 and 12 in the step 11 are equal or not is determined. If the input and the drive signal are equal and the shake compensation has been completed, the process returns to the step 10. If the input and the drive signal are not equal and the shake compensation has not been completed, the process returns to the step 11 where the shake compensation lenses 11 and 12 are driven until the shake compensation is completed.

A second embodiment of the present invention is now explained. A difference between the second embodiment and the first embodiment lies in the use of an angular acceleration sensor (not shown) in place of the angular velocity sensor. Since the angular acceleration sensor is less expensive than the angular velocity sensor, it is easier to implement from a cost standpoint. The configuration and block diagram of the second embodiment are same as those of the first embodiment except that the angular velocity sensor 7 has been substituted by the angular acceleration sensor (not shown).

Figure 5:
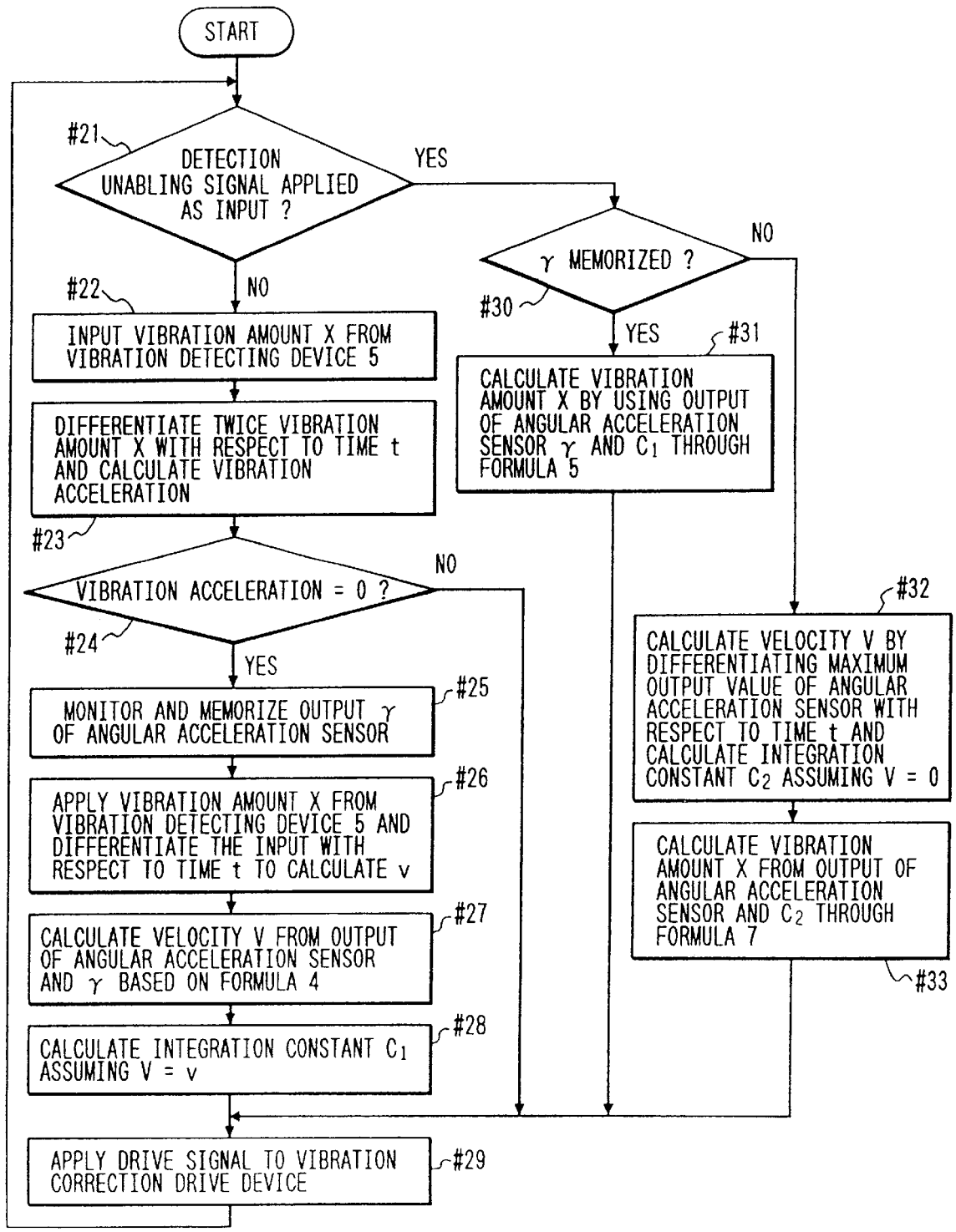
FIG. 5 shows a flow chart of an operation of a CPU in a shake control unit 9 of the modification.

FIG. 5 shows a flow chart of an operation of a CPU in the shake control unit 9. The flow chart of FIG. 5 is explained below.

The flow from the start to the step 22 is same as that from the start to the step 2 in FIG. 3, and the explanation thereof is omitted.

In a step 23, the shake amplitude X inputted in the step 22 is differentiated by time t twice to calculate the shake angular acceleration.

In a step 24, whether the shake angular acceleration calculated in the step 23 is zero or not is determined. If the shake angular acceleration when the shake amplitude X was received is zero, the offset γ of the angular acceleration sensor is checked in the step 25. If the shake angular acceleration is not zero, the process proceeds to a step 29.

In the step 25, the output of the angular acceleration sensor is monitored and the output γ thereof is stored. The stored value γ is used as the offset of the angular acceleration sensor. In the step 25, each time the offset γ is monitored, the offset is stored to update the stored offset. In this manner, the shake amplitude X can be calculated by a formula (5) to be described later with the offset γ which complies with a photographing condition for each photographing.

In a step 26, the shake amplitude X is received from the shake detector 5, and the shake amplitude X is differentiated by time t to calculate a shake velocity v from the detection output of the shake detector 5.

In a step 27, the shake angular acceleration is integrated by time t as shown by the formula (4) by using the output of the angular acceleration sensor (not shown) and the offset γ of the angular acceleration sensor stored in the step 25 to calculate the shake velocity v from the detection output of the angular acceleration sensor.

$$V = \int (a_s - \gamma) dt + C_1 \tag{4}$$

where $a_s$ is the angular acceleration detected by the angular acceleration sensor. The detected angular acceleration $a_s$, the actual angular acceleration a and the offset γ have the following relationship:

$$a_s = a + f$$

In a step 28, the integration constant $C_1$ of the formula (4) is calculated by setting v=V, where v is the velocity calculated in the step 26, and V is velocity calculated in the step 27.

In a step 29, a drive signal is supplied to the shake compensation driver 8 in accordance with the shake amplitude X inputted in the step 22, and the process returns to the step 1.

In a step 30, whether the offset ∫ has been stored in the step 25 or not is determined. If it has been stored, the process proceeds to a step 31, and if it has not been stored, the process proceeds to a step 32.

In the step 31, the shake velocity V is integrated by time t as shown by the formula (4) by using the output of the angular acceleration sensor (not shown), the offset ∫ of the angular acceleration sensor stored in the step 25 and the integration constant $C_1$ calculated in the step 28 to calculate the shake amplitude X from a formula (5).

$$\begin{aligned} X &= \int f \cdot v dt \\ &= \int [\int (a_s - \gamma) dt + C_1] \cdot f dt \end{aligned} \tag{5}$$

In the step 32, the angular acceleration is integrated by time t to calculate the velocity, and an integration constant $C_2$ in the velocity formula is calculated in order to calculate the shake amplitude by integrating the velocity formula by time t. The calculation of the integration constant $C_2$ is explained below. The acceleration a is a function of the time t and is given by $a_s - \cdot = \alpha(t)$. In order to calculate the velocity V, α(t) is integrated by time t:

$$X = \int \alpha(t)dt \qquad (6)$$
$$= \int (a_s - \gamma)dt + C_2 = A(t)$$

where A(t) is the integration of α(t) by time t. In order to calculate the velocity V from a time $t_1$ to a time $t_2$, the acceleration a, is integrated from $t_1$ to $t_2$:

$$V = A(t_2) - A(t_1)$$

Figure 6:
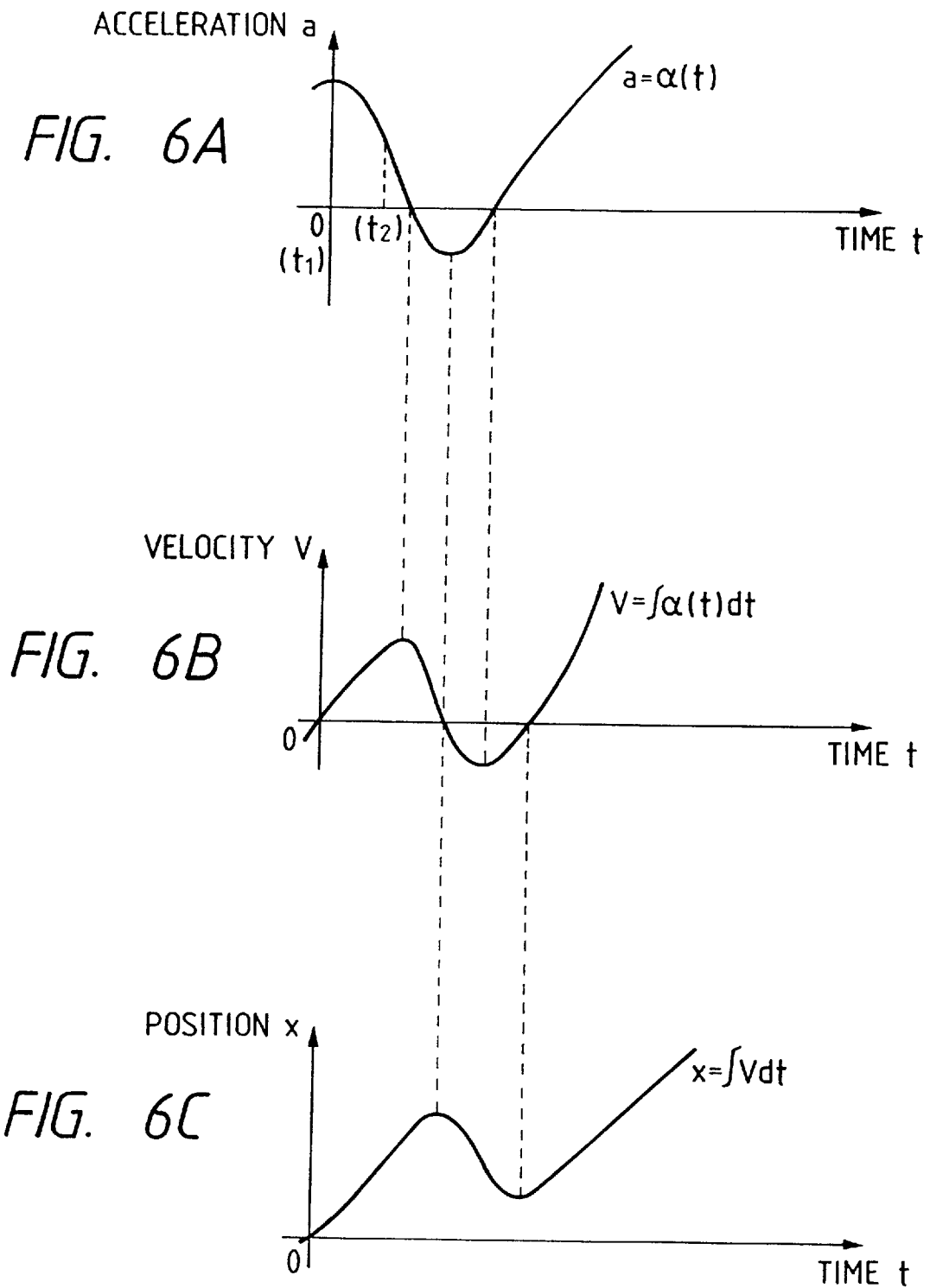
FIG. 6A shows a relationship among a position, a velocity and an acceleration of the shake in the modification.
FIG. 6B shows the velocity of the shake in the modification.
FIG. 6C shows the position of the shake in the modification.

Assuming that the acceleration $\alpha(t_1)$ at the time $t_1$ is a boundary of switching from a positive acceleration to a negative acceleration, relationships among the shake position x, the velocity V and the acceleration a with the time $t_1$ being an origin point (the time $t_1$ is 0) are shown in FIGS. 6A–6C. Since the velocity V is zero as shown in FIG. 6B, $$V = A(t_1) = A(0) = 0$$

Thus, the integration constant $C_2$ in the formula (6) of V=A(t) can be calculated.

After the calculation constant $C_2$ has been calculated, the velocity V after the time t=0 can be calculated by putting a desired time t into the formula (6).

In the step 33, the velocity V is integrated by time t as shown by a formula (7) by using the output of the angular acceleration sensor (not shown), the integration constant $C_2$ calculated in the step 32 and γ=0 to calculate the shake amplitude X.

$$X = \int V \cdot fdt \qquad (7)$$
$$= \int [\int \alpha(t) dt] \cdot fdt$$
$$= \int [\int (a_s - \gamma)dt + C_2] \cdot dft$$

In a step 29, a drive signal is supplied to the shake compensation driver 8 in accordance with the shake amplitude X calculated in the step 31 or 33, and the process returns to the step 1.

The process of inputting or calculating the shake amount X and supplying the drive signal to the shake compensation driver 8 in accordance with the shake amplitude X is repeated by the CPU of the shake control unit 9 until the power switch (not shown) is turned off.

The operation of the CPU in the shake compensation driver 8 of the second embodiment is identical to that of the CPU shown in FIG. 4 in the first embodiment, and the explanation thereof is omitted.

In the first and second embodiments, the detection disable signal is produced by the shake detector 5 not only when the environmental brightness is low but also when the release button (not shown) is fully depressed to turn on the release switch (not shown) so that the shake detector 5 receives the mirror drive-up signal from the release control circuit (not shown).

In the first and second embodiments, when the shake control unit 9 receives the detection disable signal from the shake detector 5, it switches the shake detection output from the detection output of the optical shake detection device to the detection output of the mechanical shake detection device. Alternatively, the mirror drive-up signal produced by the release control circuit (not shown) which indicates the depression of the release button (not shown) may be supplied directly to the shake control unit 9 without routing the shake detector 5 so that the detection output is switched by the mirror drive-up signal.

Figure 7:
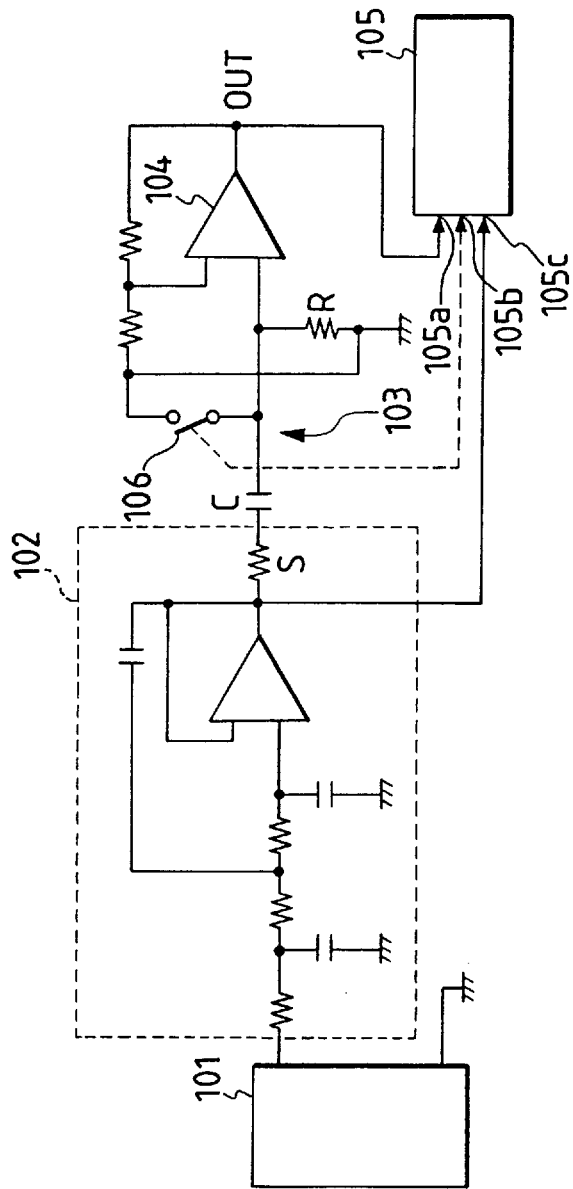
FIG. 7 is a block diagram showing an embodiment of the apparatus according to the present invention for detecting an unintentional movement of hands.
Figure 11:
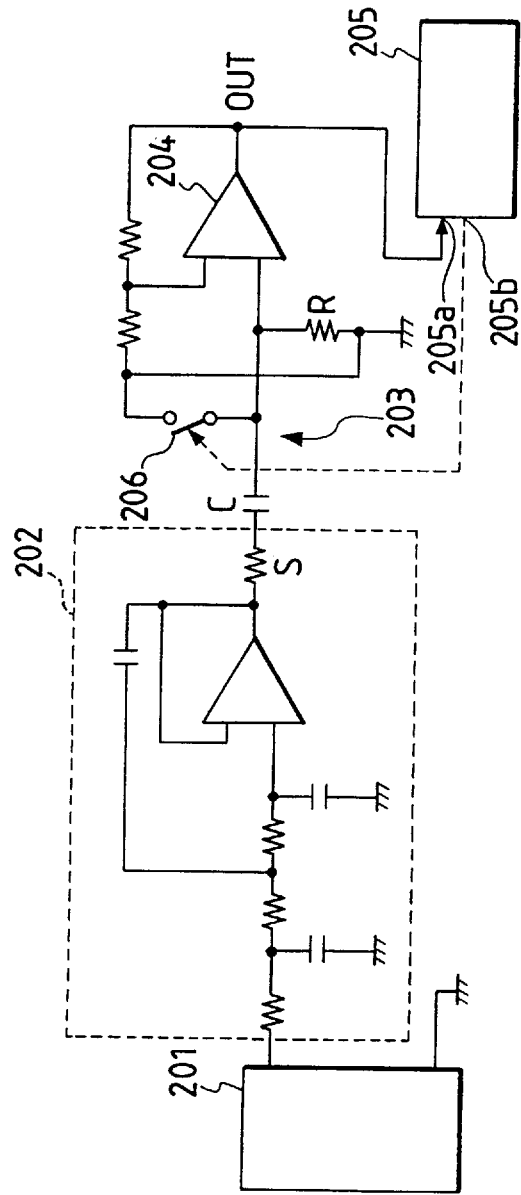
FIG. 11 is a block diagram showing a conventional apparatus for detecting an unintentional movement of hands.

FIG. 7 is a block diagram showing the third embodiment of the apparatus according to the present invention for detecting an unintentional movement of hands. In this embodiment, a control circuit 105 including a computer further has a second A/D conversion input terminal 105C, to which the output S from an LPF 102 is applied. The rest of the constitution is the same as the above-mentioned constitution shown in FIG. 11.

Figure 8:
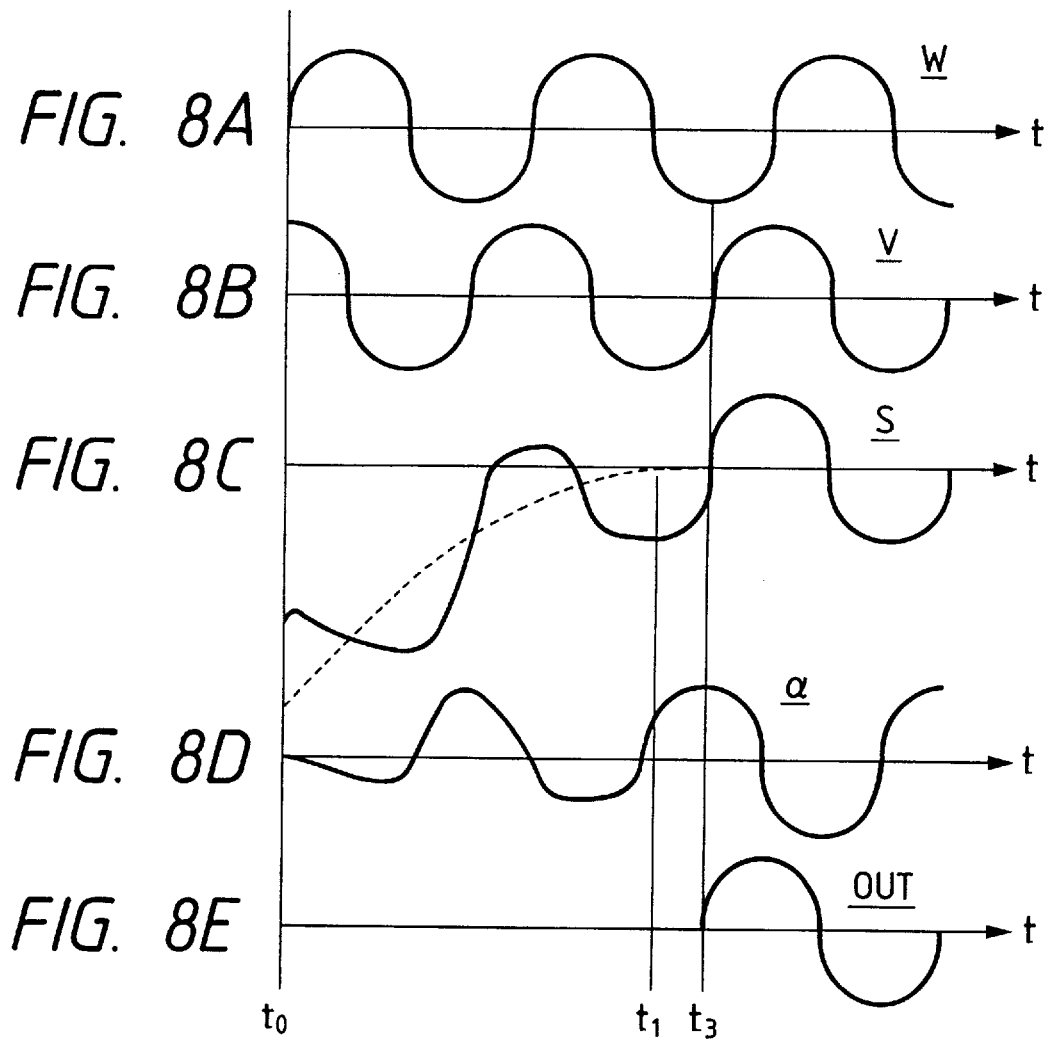
FIGS. 8A to 8E are views showing waveforms obtained in respective units.

FIGS. 8A to 8E are views showing waveforms obtained in respective units while the power source is turned on (t=t0) and in case that the camera is shaken with the unintentional movement of hands. The waveforms shown in FIGS. 8A to 8C are the same as the above-mentioned waveforms shown in FIGS. 12A to 12C, respectively. That is, FIG. 8A shows the angular displacement ω caused by the movement of hands and detected by the angular sensor 101, FIG. 8B shows the angular velocity v caused by the movement of hands, which is the output of the angular velocity sensor 101, and FIG. 8C shows the output S of the LPF 102. FIG. 8D shows the angular acceleration a obtained by differentiating the output S of the LPF 102, and FIG. 8E shows the output OUT of an operational amplifier 104.

Figure 9:
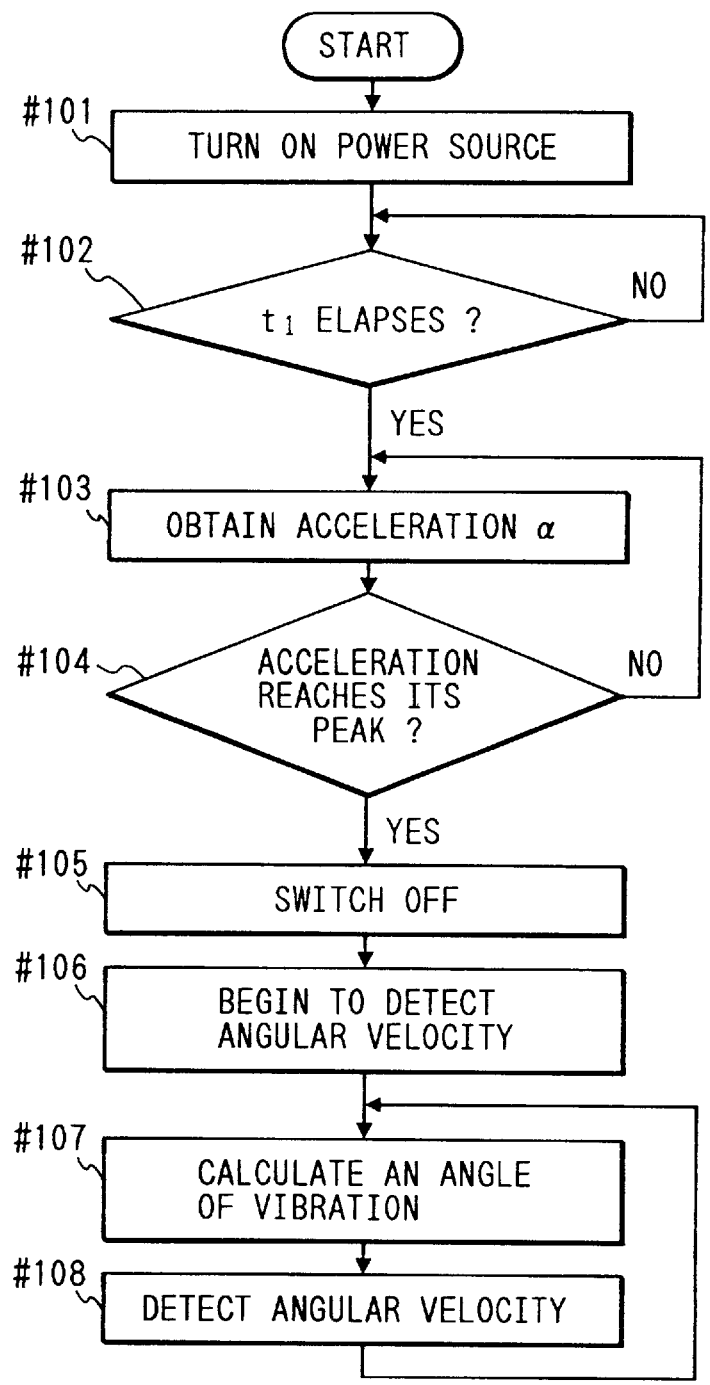
FIG. 9 is a flow chart for explaining the operation of the embodiment according to the present invention.

Now, the operation of the present embodiment will be described with reference to the flow chart shown in FIG. 9. First, when the power source is turned on at time t0 (step #101), whether the time t1 required for the angular velocity sensor 101 to obtain stationary state has elapsed or not is judged (step #102). If the time t1 has already elapsed, the control circuit 105 differentiates the output S of the LPF 102 applied to the input terminal 105c to obtain the angular acceleration α (step #103).

Next, the time when the amount of change of the angular acceleration α becomes equal to 0, that is, the time when the value of the angular acceleration a reaches its peak is detected (step #104). And at that time the switch 106 is turned off (step #105). In this embodiment, the switch 106 is turned off at time t3. As the angular velocity v is then equal to 0, the output S of the LPF 102 and the angular velocity Δv are also equal to 0.

Accordingly, the output OUT of the operational amplifier 104 gives exact angular velocity immediately after the switch 106 is turned off. And the control circuit 105 immediately starts detection of the angular velocity (step #106), integrates the result of the detection of the angular velocity and obtains the angle of the shake (step #107), and detects the angular velocity (step #108). The above calculation of the angle of the shake (#107) and detection of the angular velocity (step #108) are repeated.

Figure 10:
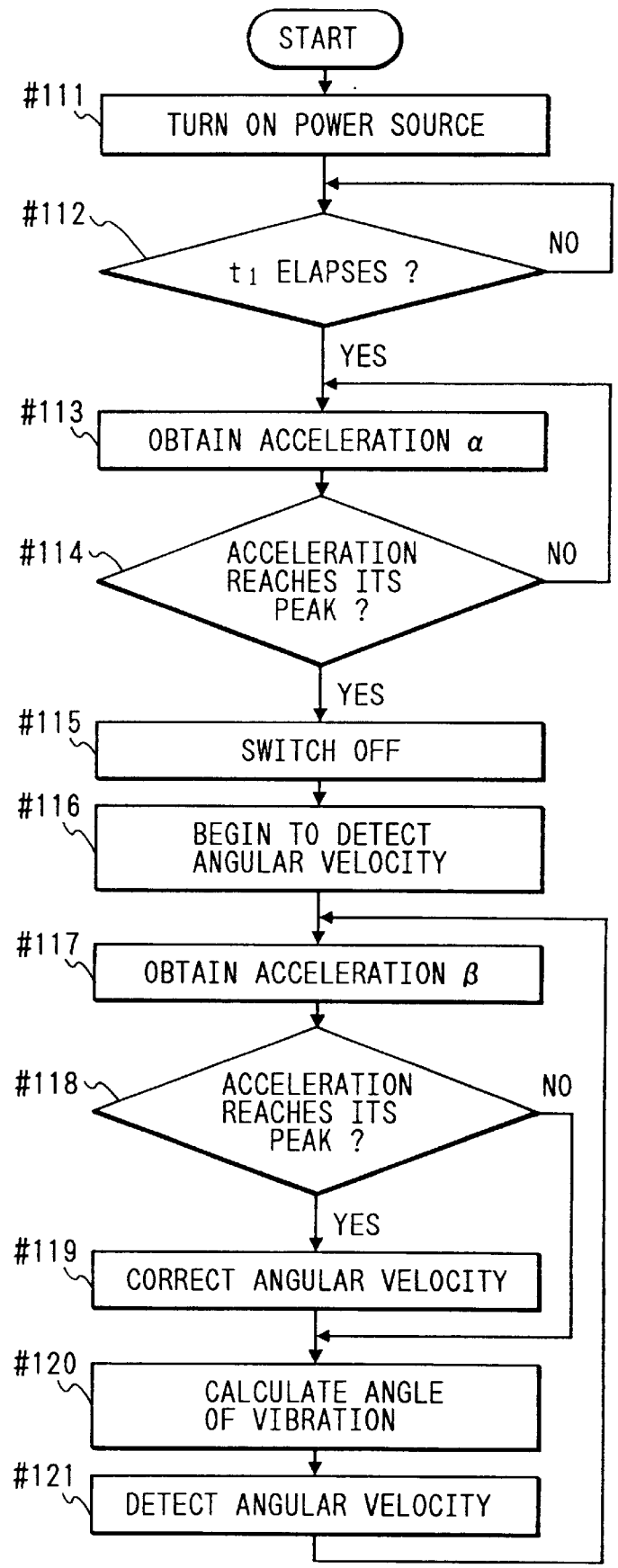
FIG. 10 is a flow chart for explaining the operation of another embodiment according to the present invention.

Now, the operation of another embodiment according to the present invention will be described with reference to the flow chart shown in FIG. 10. Though, in the above-mentioned embodiment, the time to turn off the switch 106 when the angular acceleration a reaches its peak, that is, when the angular velocity becomes equal to 0, is detected on the basis of the output S of the LPF 102, said time when the angular velocity is equal to 0 can be detected more exactly on the basis of the output OUT of the operational amplifier 104, for the signals are amplified. In this embodiment, in consideration of this, the time when the angular velocity v becomes equal to 0 is more exactly detected. Incidentally, the processes from step #111 to step #116 are the same as those from step #101 to step #106 described before, and description thereof will be omitted.

In step #115, if the time to turn off the switch 106 when the angular velocity v is equal to 0 is not exactly detected, the angular velocity Δv, that is, the error arises as in the prior art. Accordingly, in order to detect said error, the output S of the operational amplifier 104 is differentiated to obtain angular acceleration β (step #117) and whether the angular acceleration β reaches its peak or not is judged (step #118).

If the angular acceleration reaches its peak, the output S at that time of the operational amplifier 104 is stored and defined as Δv. After that, exact angular velocity can be obtained by subtracting thus defined Δv from the values of angular velocity obtained afterward (step #119). Then, as in the above-mentioned embodiments, the corrected angular velocity is integrated to obtain the angle of the shake (step #120), and the angular velocity is detected from the output of the operational amplifier 104 (step #121). And then, the operation returns to step #117, thus the above processes are repeated.

In accordance with the present invention, the mechanical shake detection device and the optical shake detection device having a better performance than the mechanical shake detection device are used, and the shake is compensated by using the detection output of the optical shake detection device when the optical shake detection device is able to detect the relative positional displacement of the object image, and using the calculated output of the mechanical shake detection device which calculates the shake amplitude while taking the error inherent to the mechanical sensor into consideration when the optical shake detection device is unable to detect the relative positional displacement of the object image. Accordingly, the optimum shake compensation is always attained before and during the photographing.

According to the present invention, the time when the angular velocity becomes equal to 0 is detected and the output of the angular velocity sensor starts to be taken in at that time. Or, even if the output of the angular velocity is not taken in exactly at the time when the angular velocity is equal to 0, the error caused by said time lag is corrected. Therefore, exact angular velocity can be obtained immediately after the switch is turned off, which makes it possible to rapidly detect the shake of the camera caused by the unintentional movement of hands in taking a picture.

What is claimed is:

1. An apparatus for detecting an unintentional movement of hands, comprising:

an angular velocity sensor for detecting a shake of a camera;

a high-pass filter for filtering off certain low frequency components from the output of said angular velocity sensor;

a switch means for initializing said high-pass filter when a power source is turned on; and a control means for detecting a time when the output of said angular velocity sensor becomes equal to zero and switching said switch means in order to bring said high-pass filter in a active state.

2. An apparatus for detecting an unintentional movement of hands, comprising:

an angular velocity sensor for detecting a shake of a camera;

an operation means for calculating the angular acceleration from the output of said angular velocity sensor;

a storage means for storing an error of the output of said angular velocity sensor according to said operation means; and a correction means for correcting the output of said angular velocity sensor according to the output of said storage means.

3. An apparatus for detecting an unintentional movement of hands according to claim 2, further comprising a detection means for detecting from said operation means that said angular acceleration is equal to zero, wherein said storage means stores the error of the output of said angular velocity sensor according to the output of said detection means.

4. An apparatus which detects an unintentional movement of hands, comprising:

an angular velocity sensor which detects a shake of a camera;

a high-pass filter which filters off certain low frequency components from the output of said angular velocity sensor;

a switch device which initializes said high-pass filter when a power source is turned on; and a control device which detects a time when the output of said angular velocity sensor becomes equal to zero and which switches said switch device in order to bring said high-pass filter in an active state.

5. An apparatus which detects an unintentional movement of hands, comprising:

an angular velocity sensor which detects a shake of a camera;

an operation device which calculates angular acceleration from the output of said angular velocity sensor;

a storage device which stores an error of the output of said angular velocity sensor according to said operation device; and a correction device which corrects the output of said angular velocity sensor according to the output of said storage device.

6. An apparatus which detects an unintentional movement of hands according to claim 5, further comprising a detection device which detects from said operation device that said angular acceleration is equal to zero, wherein said storage device stores the error of the output of said angular velocity sensor according to the output of said detection device.

* * * * *